(12) United States Patent
Wuerkert et al.

(10) Patent No.: US 7,741,501 B2
(45) Date of Patent: Jun. 22, 2010

(54) PROCESS FOR HETEROGENEOUSLY CATALYZED HYDROGENATION

(75) Inventors: Stephan Wuerkert, Munich (DE); Bernhard Gutsche, Hilden (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 11/670,228

(22) Filed: Feb. 1, 2007

(65) Prior Publication Data

US 2007/0225527 A1    Sep. 27, 2007

(30) Foreign Application Priority Data

Feb. 2, 2006    (DE)    ........................ 10 2006 004 743

(51) Int. Cl.
C07C 51/36    (2006.01)
(52) U.S. Cl. ........................ 554/141; 554/144; 568/484; 568/864
(58) Field of Classification Search ................. 554/141, 554/144; 568/484, 864
See application file for complete search history.

(56) References Cited

OTHER PUBLICATIONS

Twigg et al., "Deactivation of supported 'copper metal catalysts for hydrogen'a'tJon reactions." Applied Catalysis, 2001, vol. 212, pp. 161-174.*
E.V,W,Gntz, "Fat Hydrogenation," Handbook of heterogeneous Catalyst, 1997, vol. 5, pp. 2221-2231.*
Twigg et al., "Deactivation of copper metal catalysts for methanol decomposition, methanol steam reforming and methanol synthesis," Topics in Catalysis, 2003, vol. 22, pp. 191-203.
Twigg et al., "Deactivation of supported copper metal catalysts for hydrogenation reactions." Applied Catalysis, 2001, vol. 212, pp. 161-174.
Hansen, J.B., "Methanol Synthesis", Handbook of Heterogeneous Catalysis, 1997, vol. 4, pp. 1856-1876.
Rieke et al., FAME hydrogenation to fatty alcohol Part 1: Correlation between catalyst properties and activity/selectivity, 1997,JAOCS, vol. 74, pp. 333-339.
Schneider et al, Die Anwendung von Kupferchromit-Katalysatoren in der Hydrierung von Fettsaeureestem zu Fettalkoholen, Fett Wissenschaft Technologie, 1987, vol. 89, pp. 508-512.
Thakur et al., Fatty Methyl Ester Hydrogenation to Fatty Alcohol: Reaction Inhibition by Glycerine and Monoglyceride, JAOCS, 1999, vol. 76, pp. 995-1000.
Voeste et al. "Production of Fatty Alcohols from Fatty Acids," 1984, JAOCS, vol. 61, pp. 350-352.
E.V.W.Gritz, "Fat Hydrogenation," Handbook of heterogeneous catalysis, 1997, vol. 5, pp. 2221-2231.

* cited by examiner

*Primary Examiner*—Deborah D Carr

(57) ABSTRACT

A process for carrying out heterogeneously catalyzed hydrogenation reactions in a fixed-bed reactor includes providing at least one main reactor containing a first amount of catalyst; providing a first auxiliary reactor and a second auxiliary reactor, each containing a second amount of catalyst, wherein the first amount of catalyst is relatively larger than the second amount of catalyst; passing a starting product of a fatty compound through the first auxiliary reactor and reacting the starting product with hydrogen in the presence of the catalyst; continuing the reaction through the at least one main reactor; and continuing the reaction through the second auxiliary reactor, wherein the first auxiliary reactor is reactivated. Another process provided includes a first and second main reactor, and a first and second auxiliary reactor, where relatively pure and impure starting products of a fatty compound are processed substantially continuously by cyclic switching of the reactors.

20 Claims, 6 Drawing Sheets

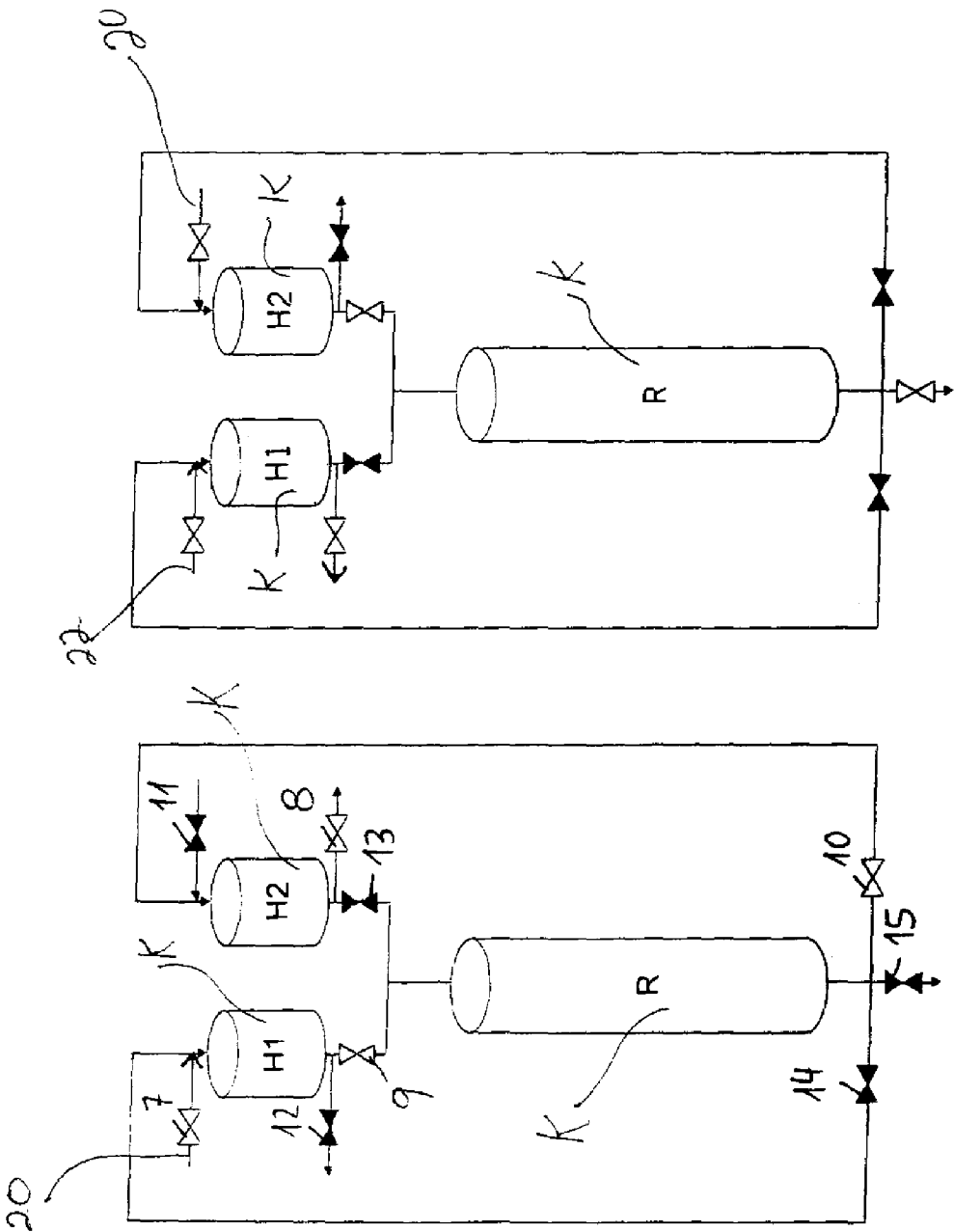

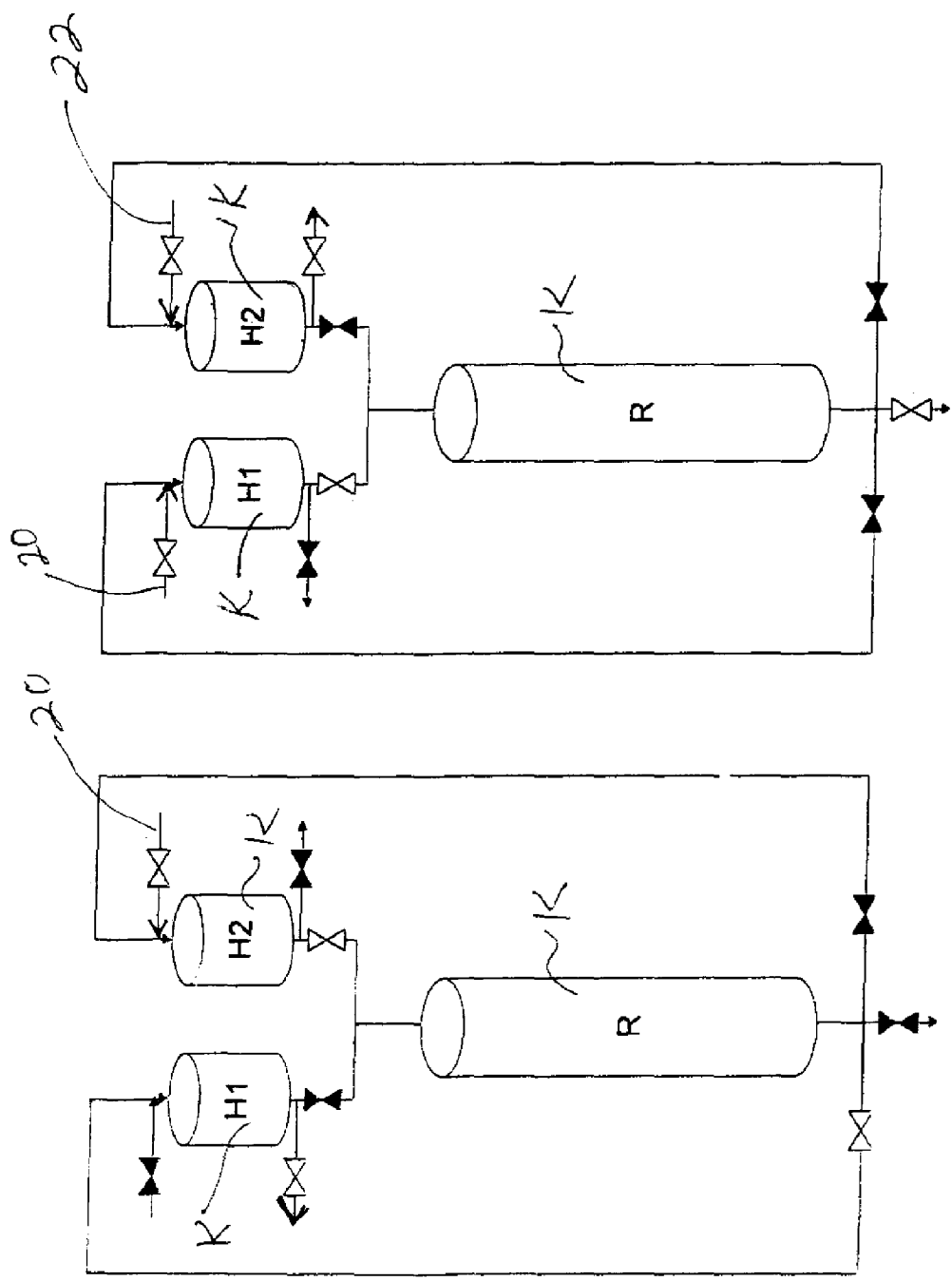

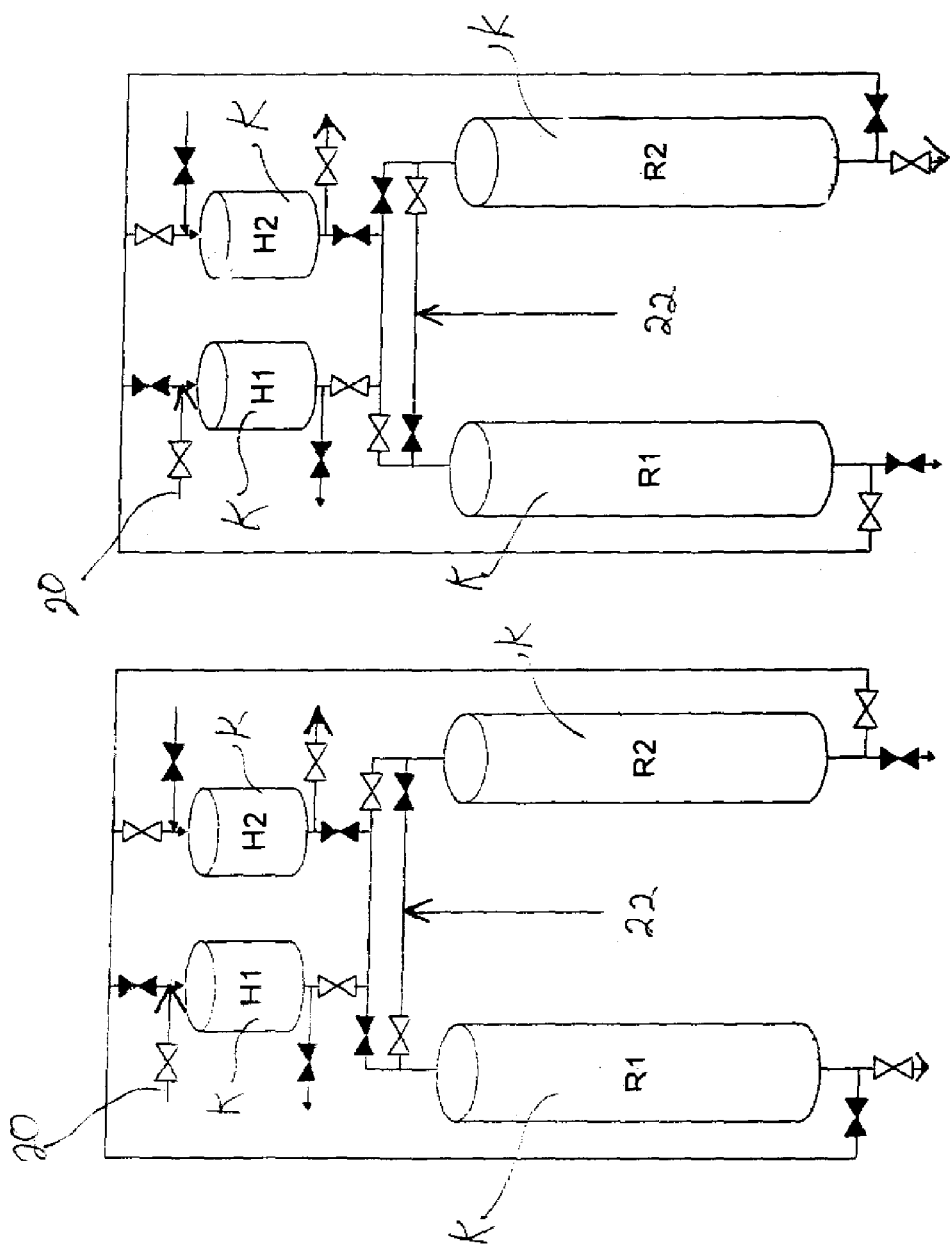

PROCESS FOR HETEROGENEOUSLY CATALYZED HYDROGENATION

CROSS-REFERENCE TO RELATED APPLICATIONS

This application claims priority under 35 U.S.C. §119 from German Patent Application No. 102006004743.5, filed Feb. 2, 2006, the entire disclosure of which is hereby incorporated by reference.

BACKGROUND OF THE INVENTION

1. Field of the Invention

This invention relates generally to a process for carrying out heterogeneously catalyzed hydrogenation reactions, and more particularly to heterogeneously catalyzed hydrogenation reactions in a fixed-bed reactor for hydrogenating fatty compounds, including native fats, oils, and derivatives thereof, including fatty acid methyl esters to form saturated fatty alcohols.

2. Background Information

The heterogeneously catalyzed hydrogenation of fatty acid methyl esters (FAME) to saturated fatty alcohols in fixed-bed reactors has the particular asset that an almost complete conversion of the educt to the required product is basically possible without having to accept serious losses of selectivity through consecutive hydrogenation to hydrocarbons or through unwanted secondary reactions.

In practice, however, the heterogeneous catalyst (for example Cu—Cr) undergoes significant deactivation in the course of a production campaign which may be attributed to the following influences:

1. Deactivation of the active catalytic surface by compounds of S, Cl and P as discussed by Twigg, M. V. et al., *Deactivation of copper metal catalysts for methanol decomposition, methanol steam reforming and methanol synthesis*, Topics in Catalysis, Vol. 22, No. 3-4, 2003, and Appl. Catal., Vol. 212, pp. 161-174, 2001;
2. Sintering of the active Cu surface by high local temperatures, as discussed by Twigg, cited above, and in "*Methanol Synthesis*", Hansen, J. B., *Handbook of heterogeneous catalysis*, Vol. 4, pp. 1859-1860, edited by Ertl, G., Knötzinger, H. and Weitkamp, J., VCH, Weinheim, 1997;
3. Discharge of the active species through formation of copper soaps and attacking of the matrix through the formation of zinc soaps in the case of Cu—Zn catalysts and a high content of free fatty acids as discussed by Rieke, R. D. et al., FAME hydrogenation to fatty alcohol Part I: *Correlation between catalyst properties and activity/selectivity*, JAOCS, Vol. 74, No. 4, pp. 333-339, 1997, and Schneider, M. et al., *Die Anwendung von Kupferchromit-Katalysatoren in der Hydrierung von Fettsäureestem zu Fettalkoholen*, Feft Wissenschaft Technologie, Vol. 89, S. 508-512, 1987;
4. Reversible deactivation, for example through traces of free glycerol, monoglycerides and water as discussed by Thakur, D. S., et al., *Fatty Methyl Ester Hydrogenation to Fatty Alcohol: Reaction Inhibition by Glycerine and Monoglyceride*, JAOCS, Vol. 76, No. 8, pp. 995-1000, 1999.

The following publication may also be of interest: Voeste, T. et al., *Production of fatty alcohols from fatty acids*, JAOCS, Vol. 61, No. 2, p. 350-352, 1984.

The average life of the fixed-bed catalyst in the industrial-scale production of fatty alcohols is around 60 to 120 days as discussed in Gritz, E., *Fat hydrogenation*, Handbook of heterogeneous catalysis, Vol. 5, pp. 2221-2231; edited by Ertl, G.; Knödtzinger, H. and Weitkamp, J., VCH, Weinheim, 1997. Sintering of the catalyst can be avoided on the one hand by activating the catalyst at moderate temperatures (for example, at most 200° C.) as discussed in *Methanol Synthesis*, cited above, so that deactivation through sintering during the production period is significantly limited. In addition, thorough dispersion of the catalyst leads to less sintering. On the other hand, ageing through raw material impurities, i.e., catalyst poisons, can be avoided by using only freshly prepared, i.e., purified, FAME fractions.

In practice, gradual ageing of the catalyst is still observed over several months, as known from Gritz, cited above. The loss of activity of the catalyst can be compensated by the following measures in order to maintain high conversions for almost undiminished selectivity:

1. raising the temperature at the reactor entrance or in the reactor casing,
2. reducing the throughput of liquid.

Raising the temperature is limited for two reasons. First, a high temperature promotes the formation of hydrocarbons of which the maximum concentration in the marketable product must not be exceeded. Second, raising the average temperature involves the danger of the activity of the catalyst being additionally reduced by increased sintering. There are also limits to the second measure insofar as any reduction in the LHSV (liquid hourly space velocity) results in a direct reduction in the volume/time yield. In addition, there is generally a deterioration in wetting, so that, with lower throughputs, the reactor is no longer operated at optimal efficiency.

The time at which the catalyst bed is renewed is thus determined by the basic economic conditions. In general, the production cycle may be divided up into the following phases:

1. Charging;
2. Activating the catalyst bed;
3. Startup;
4. Production under optimal operating conditions;
5. Reducing the throughput to compensate for catalyst deactivation;
6. Raising the temperature as further compensation for ageing of the catalyst; and
7. Shutting down the plant and emptying the reactor.

In order to increase the life of the catalyst in the reactor, it is known that an auxiliary reactor (guard bed) can be installed in front of the reactor as described by Twigg, cited above. Accordingly, the starting product is passed first through the auxiliary reactor, which traps a large proportion of the constituents harmful to the reactor (catalyst poisons), and then into the main reactor. Since the concentration of fatty acid methyl ester is maximal in this auxiliary reactor, so that the reaction rate is particularly high, heat is generated in particular abundance by the exothermic reaction, so that sintering is particularly high in the auxiliary reactor. Accordingly, the auxiliary reactor also protects the main reactor against sintering.

However, the disadvantage of the prior art is that the catalyst in the auxiliary reactor is consumed particularly quickly. To change the catalyst, the plant firstly either has to be shut down or, secondly, the starting product has again to be passed directly—and disadvantageously—through the main reactor, meaning that the unwanted increased deactivation of the catalyst in the main reactor has to be accepted. In addition, throughput has to be reduced in this case on account of the reduced total amount of catalyst because substantially complete reaction of the fatty acid methyl ester to fatty alcohol is necessary in order to avoid subsequent difficulties during working up of the reaction mixture. Thirdly, the auxiliary reactor could basically be replaced by a second auxiliary reactor with a fresh catalyst bed. The disadvantage of this would be that only half the total capacity of the two auxiliary reactors would be utilized because only one auxiliary reactor would ever be in operation.

SUMMARY OF THE INVENTION

Briefly described, according to an aspect of the invention, a process for carrying out heterogeneously catalyzed hydrogenation reactions in a fixed-bed reactor includes the steps of providing at least one main reactor containing a first amount of catalyst; providing a first auxiliary reactor and a second auxiliary reactor, each containing a second amount of catalyst, wherein the first amount of catalyst is relatively larger than the second amount of catalyst; passing a starting product of a fatty compound through the first auxiliary reactor and reacting the starting product with hydrogen in the presence of the catalyst; continuing the reaction through the at least one main reactor; and continuing the reaction through the second auxiliary reactor, wherein the first auxiliary reactor is reactivated.

According to another aspect of the invention, a process for carrying out heterogeneously catalyzed hydrogenation reactions in a fixed-bed reactor includes the steps of (a) providing at least a first main reactor and a second main reactor, each containing a first amount of catalyst; (b) providing a first auxiliary reactor and a second auxiliary reactor, each containing a second amount of catalyst, wherein the first amount of catalyst is relatively larger than the second amount of catalyst; (c) passing a relatively impure starting product of a fatty compound through the first auxiliary reactor wherein the starting product reacts in the presence of the catalyst; (d) continuing the reaction process through the second main reactor and the second auxiliary reactor; (e) continuing the reaction process by passing the relatively impure starting product through the first auxiliary reactor, the first main reactor, and the second auxiliary reactor, wherein the first auxiliary reactor is reactivated; (f) continuing the reaction process by passing the relatively impure starting product through the second auxiliary reactor to the first main reactor while passing a relatively pure starting product of a fatty compound through the reactivated second main reactor and reactivated first auxiliary reactor, wherein the second auxiliary reactor is reactivated; (g) continuing the reaction process from the reactivated first auxiliary reactor through the first main reactor while continuing to pass the relatively pure starting product through the reactivated second main reactor and reactivated second auxiliary reactor, wherein the first main reactor is reactivated; and repeating steps (a) through (g).

BRIEF DESCRIPTION OF THE DRAWINGS

FIG. 2 is a flow chart of Phase 1 of the cyclic switching of a main reactor with two smaller auxiliary reactors in a first embodiment of the invention for the production of fatty alcohol by hydrogenation of fatty acid methyl ester, where the production (series arrangement) is H1+R+H2;

FIG. 3 shows Phase 2 of the cyclic switching illustrated in FIG. 2, where the production (series arrangement) is H2+R, and the activation is H1;

FIG. 4 shows Phase 3 of the cyclic switching illustrated in FIGS. 2 and 3, where the production (series arrangement) is H2+R+H1;

FIG. 5 shows Phase 4 of the cyclic switching shown in FIGS. 2 to 4, where the production (series arrangement) is H1+R, and the activation is H2;

FIG. 6 shows Phase 1 of the cyclic switching of two main reactors and two auxiliary reactors in a second embodiment of the invention for the production of fatty alcohol by hydrogenation of fatty acid methyl ester, where the activation is R1 and the production (series arrangement) is H1+R2+H2;

FIG. 7 shows Phase 2 of the cyclic switching illustrated in FIG. 6, where the activation is R2 and the production (series arrangement) is H1+R1+H2;

DETAILED DESCRIPTION OF THE INVENTION

Figure 1:
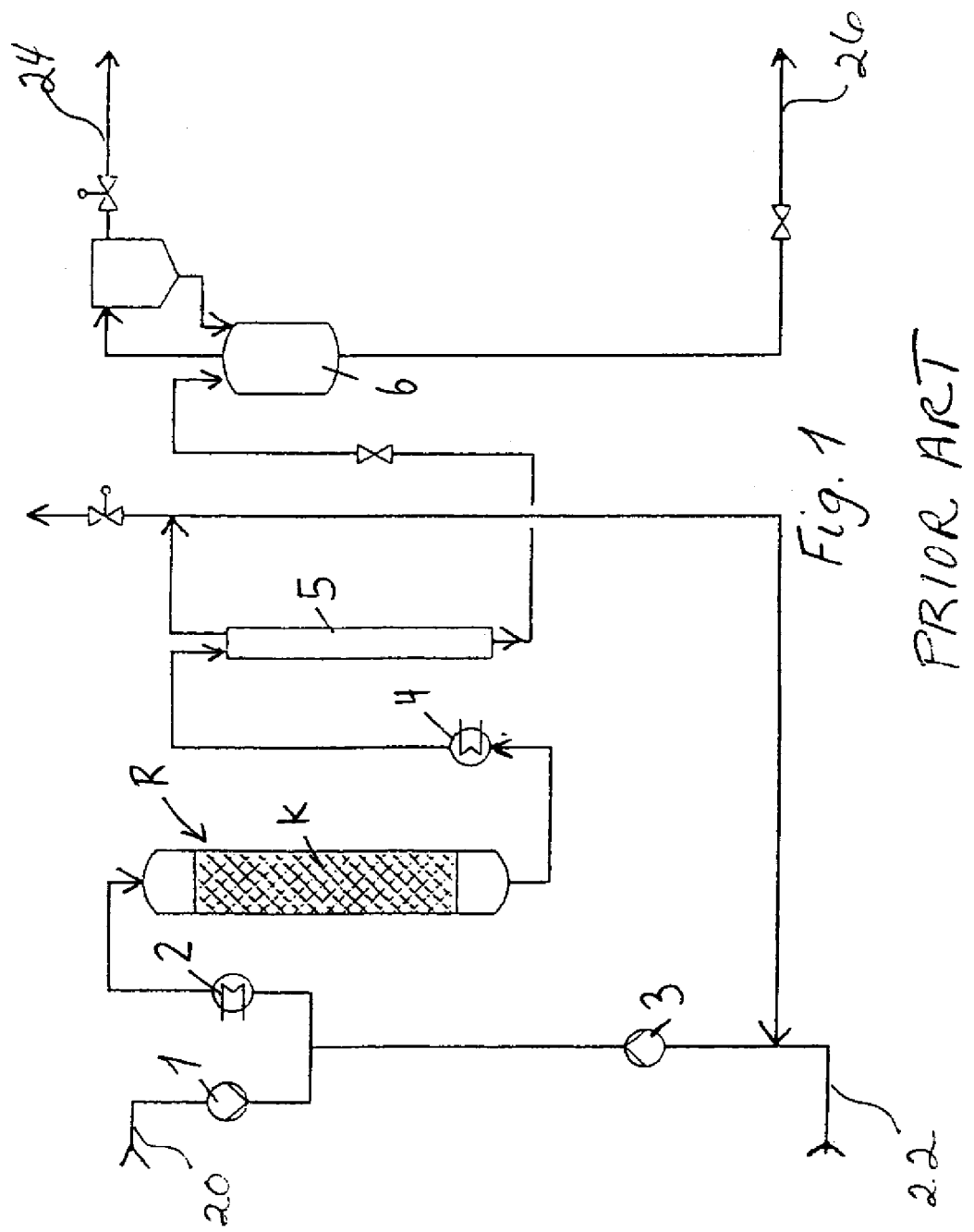
FIG. 1 is a flow chart of a known plant for the production of fatty alcohols from fatty acid methyl ester by fixed-bed hydrogenation, but without an auxiliary reactor.

Against this background, the problem addressed by the present invention was to enable the production process mentioned at the beginning to be carried out continuously over a particularly long period with a complete conversion and high throughputs without the catalyst in the main reactor having to be changed.

According to the invention, the solution to this problem for the process mentioned at the beginning is characterized in that at least two auxiliary reactors are used, in that the main reactor or at least one of the main reactors is always preceded by one of the auxiliary reactors, in that the other auxiliary reactor follows the main reactor or the catalyst filling of this other auxiliary reactor is renewed. The cyclic switching sequence of the reactors ensures that:

1. One auxiliary reactor always functions as a preliminary reactor, and
2. The second auxiliary reactor is always used as an afterreactor and serves as a permanently available, i.e., activated, reserve for the preliminary reactor and, at the same time, to increase the overall throughput without the activity of the fixed bed being impaired. Accordingly, the other auxiliary reactor serves as a reserve for the exchange when the preliminary auxiliary reactor has to be taken out of production, i.e., shut down, to renew the catalyst bed, so that the main reactor is always preceded by an auxiliary reactor and the feed is never introduced directly into the main reactor. In addition, the total capacity of all the auxiliary reactors is used for almost the entire time (except for renewal of the catalyst).

According to the invention, catalytic fixed-bed reactors are cyclically switched to optimize catalyst life, more particularly in the case of hydrogenations with a complete or almost complete conversion. According to the invention, therefore, the known production cycle can be optimized by cyclic switching of the reactors, as explained in more detail in the following.

It was pointed out that, in practice, even a slight deactivation of the catalyst bed means that the liquid throughput has to be reduced in order to be able to maintain a complete conversion. It is typical of the process according to the invention that one or two main reactors is/are protected by the cyclic switching of smaller auxiliary reactors, so that the life of the catalyst beds in the main reactors is significantly extended.

The advantage of the smaller auxiliary reactors is that they can be switched more flexibly and activated more quickly, i.e., in shorter cycles. It is thus possible

- always to use at least one auxiliary reactor to protect the main reactor and
- to reduce the liquid throughput only slightly during the activation of an auxiliary reactor and hence to reduce the yield only slightly and
- optimally to utilize the capacity of both auxiliary reactors.

Overall, the cyclic switching of the reactors affords the following production advantages:

1. The life of a large part of the catalyst bed is extended.
2. Production stoppages are shortened by minimized set-up times.
3. The volume/time yield is increased.
4. Maintenance schedules can be flexibly integrated into production planning.

Basically, the sizes of the main and auxiliary reactors can be rigorously economically optimized. To this end, first the reaction kinetics of the fresh catalyst used in regard to the actual hydrogenation have to be known and, second, an empirical relation is necessary for the ageing of the catalyst. In addition, various production cost factors have to be taken into account in the basic optimization conditions. On the basis of these preliminary considerations, a considerable potential opens up for optimizing the heterogeneously catalyzed hydrogenation of FAME to saturated fatty alcohols.

On the basic precept (condition) that the conversion has to be complete or almost complete, the function of the auxiliary reactor following the main reactor is to achieve a complete conversion for a relatively high throughput. If, in the event of catalyst replacement in one auxiliary reactor the following auxiliary reactor drops out, throughput has to be slightly reduced due to the complete conversion requirement. Except for the slight decreases and increases in throughput, the invention affords the advantage not to be underestimated in practice that stable production conditions can be maintained for a considerably longer time than in the prior art. This provides for a very high level of dependability in regard to production planning because, according to the invention, the main reactor has several times the life of the known reactor. The catalyst in the main reactor only has to be replaced very occasionally. Accordingly, the change of catalyst in the main reactor is not mentioned in the following examples illustrating the cyclic switching.

Another advantage of the process according to the invention lies in the creation of another degree of freedom for the production conditions besides the usual degrees of freedom, such as temperature and throughput. Now, the third degree of freedom lies in the way in which the auxiliary reactors are switched with the main reactor or with the several main reactors.

If two main reactors are used together with two auxiliary reactors, as explained in more detail hereinafter with reference to one example of embodiment, a purified starting product containing relatively few components harmful to the catalyst may be processed in one main reactor which is operated without a preliminary auxiliary reactor. A starting product of poorer quality, i.e., containing a considerably larger quantity of components harmful to the catalyst, may be processed in the second main reactor which is always operated with a preliminary auxiliary reactor. The main reactors are able to exchange their starting products in the course of a production cycle, so that each of the main reactors intermittently processes a good starting product and a relatively poor starting product—in this case always with a preliminary auxiliary reactor.

The process according to the invention may be used not only for the production of fatty alcohols from fatty acid methyl esters, but also

- for the hydrogenation of triglycerides, particularly native fats and oils, such as palm kernel oil, palm oil, coconut oil, etc., to saturated fatty alcohols and 1,2-propanediol using such catalysts as CuCr promoted with Mn and/or Ba,
- for the hydrogenation of fats using such catalysts as Pd or Pt,
- for the hydrogenation of fatty acid esters to aldehydes using such catalysts as $ZrO_2$ promoted with $La_2O_3$ and/or chromium oxide or ZnO as catalyst.

The invention is not limited in regard to the type of catalyst used. For example, the following catalysts may be used for the hydrogenation of FAME to saturated fatty alcohols: Cu/ZnO, $Cu/ZnO/SiO_2$, $Cu/ZnO/Al_2O_3$, $Cu/ZnO/Fe_2O_3$, $Cu/MnO/Al_2O_3$, $Cu/Bi_2O_3/SiO_2$, CuCr promoted with Ba and/or Mn, Ce/Fe/Al.

A key aspect of the invention is that not just one auxiliary reactor, but also a second auxiliary reactor is used. The second auxiliary reactor is arranged behind the main reactor and, when the catalyst of the preliminary reactor is being replaced, takes over the function of the preliminary reactor. Another important aspect of the invention is the cyclic change in switching with a corresponding change in the mode of operation of the auxiliary reactors, namely its positioning in front of or behind the reactor or stoppage during replacement of the catalyst bed. After each cycle, the process can again be started anew with the same cycle.

In a particularly preferred variant of the invention, one main reactor and two auxiliary reactors are used (See FIGS. 2 to 5). In Phase 1 of the production cycle, one of the auxiliary reactors is used as a preliminary reactor H1 before the main reactor while the other auxiliary reactor H2 is used as an after-reactor following the main reactor. In the next Phase 2, the catalyst bed of the previous preliminary reactor H1 is renewed and activated and the previous after-reactor H2 is used as the preliminary reactor. In the next Phase 3, the auxiliary reactor H1 with the renewed and activated catalyst bed is used as the after-reactor. In the following Phase 4, the catalyst bed of the previous preliminary reactor H2 is renewed and activated and the previous after-reactor H1 is used as the preliminary reactor. The cycle is then repeated, beginning with Phase 1.

In order to achieve a high throughput for a complete or substantially complete conversion, Phases 1 and 3 of the above-mentioned process are preferably carried out with maximum liquid throughput while Phases 2 and 4 are carried out with a reduced, more particularly slightly reduced, liquid throughput in order to compensate for the reduced total quantity of catalyst in Phases 2 and 4.

If, in another variant of the process according to the invention, not just one, but two main reactors and—as before—two auxiliary reactors are used, for example, a relatively pure, prepared starting product and a relatively impure starting product are simultaneously processed (FIGS. 6 to 11).

The two main reactors are preferably of identical construction and are so large that it would not be appropriate to arrange them "in series" on account of the excessive pressure loss that would then occur, because the liquid throughput could not then be increased to levels at which a complete conversion is still achieved.

The relatively pure starting product is fed into one of the main reactors directly, i.e., without a preliminary reactor, while the relatively impure starting product is always fed into the other main reactor via a preliminary reactor.

$C_{12/14}$ FAME is preferably used as the specially prepared starting material. Since the reaction enthalpy and hence the maximum temperature increase in the reactor is less pronounced for this fraction on account of an iodine value (IV) of $\ll 1$, hardly any deactivation occurs through sintering. Since deactivation by catalyst poisons is also negligible in the case of specially prepared starting material, there is no need for a preliminary reactor in this case. Accordingly, one of the main reactors may be unequivocally assigned to the $C_{12/14}$ fractions and the other main reactor to the $C_{12-22}$ or $C_{16-22}$ etc., fractions with an IV of $\geq 10$. In the last case, the danger of sintering on entry into the fixed bed is far greater on account of the high iodine value and hence the increased heat effect.

Another embodiment is characterized in that, during the renewal and activation of the catalyst bed of one or the other main reactor only the relatively impure starting product (if available) is processed, one of the auxiliary reactors serves as the preliminary reactor and the other as the after-reactor.

If, in the case of two main reactors, both main reactors and both auxiliary reactors are in operation, a preliminary reactor is used in the processing of the relatively impure starting product and an after-reactor is used in the processing of the relatively pure starting product in order to increase the throughput for the same complete conversion.

Finally, in this case of the two main reactors, the process is preferably carried out with maximum or with reduced liquid throughput according to the quantity of catalyst used.

Similarly, the process may also be carried out with three, four and more main reactors.

In every case, the auxiliary reactors are advantageously shaft reactors, which require particularly low capital investment, while the main reactor(s) is/are either tube-bundle reactors or shaft reactors, the tube-bundle reactors having the advantage of a particularly uniform temperature distribution in the catalyst bed. Shaft reactors are more favorable where the educt has a low iodine value. Tube-bundle reactors are favorable where the educt has a high iodine value or where the reaction enthalpy is high, for example in the hydrogenation of triglycerides to fatty alcohols and 1,2-propanediol. This provides for particularly high economy in regard to capital investment and still ensures highly efficient operation with high throughputs and a complete conversion.

Two embodiments of the invention and, in addition, the general prior art in relation to fatty alcohol production are described in further detail with reference to the accompanying drawings. In all the drawings, the same reference numerals have the same meanings and, hence, may only be explained once.

FIG. 1 is a flow chart of the known so-called Henkel process for the production of saturated fatty alcohols (FA) from fatty acid methyl ester (FAME) by high-pressure hydrogenation using a copper-containing fixed-bed catalyst K. At temperatures of 200 to 250° C. and a hydrogen pressure of 200 to 300 bar, the fatty acid methyl ester FAME 20 is fed in at the head of a fixed-bed reactor R by the feed pump 1 via a heater 2. A large amount of circulating hydrogen gas $H_2$ (recycle gas) 22 transports the reactants through the reactor. The recycle gas is pump-circulated by the recycle gas pump 3 with an excess of hydrogen to fatty acid methyl ester of ca. 600, and in another method of operation between 30 and 150 mol hydrogen per mol ester. See, Gritz, E., cited above.

In order to establish a uniform reaction temperature in the catalyst bed, Henkel KGaA, Düsseldorf, had suggested the use of a tube-bundle reactor (H. D. Komp, H. P. Kubersky, Fettalkohole, Henkel, Düsseldorf 1981). However, a shaft reactor could also be used, in which case the hydrogen excess is 50 to 150 mol per mol of ester.

After leaving the reactor, the product mixture is cooled in the cooler 4 and separated into a gas phase and a liquid phase in the separator 5. The gas phase is purified and returned to the recycle gas pump 3. The liquid phase is expanded in the flash drum 6 and cooled to recover methanol (MeOH) 24 and to separate the fatty alcohol (FA) 26 from the methanol. In the known Henkel process, hydrogenation is carried out under very mild conditions and a high-purity saturated fatty alcohol containing less than 1% hydrocarbons and other secondary products is obtained.

The heterogeneously catalyzed reactions according to the invention are carded out in a fixed-bed reactor, more particularly in at least one main reactor (R, R1, R2) containing a relatively large amount of the catalyst and in at least one auxiliary reactor (H1, H2) preceding the main reactor, which contains a relatively small amount of the catalyst. At least two auxiliary reactors (H1, H2) are used, the main reactor (R) or at least one of the main reactors (R1, R2) is always preceded by one of the auxiliary reactors (H1, H2) and followed by the other auxiliary reactor unless the catalyst filling of this other auxiliary reactor is renewed and activated. The process provides for uninterrupted production over a particularly long period with a complete conversion and high throughputs without the catalyst in the main reactor having to be changed.

Two embodiments of the invention for the cyclic switching of the hydrogenation reactors will now be described in detail with reference to FIGS. 2 to 11. As in FIG. 1, the recycle gas $H_2$ 22 always flows in co-current with the FAME.

Embodiment 1

A particularly preferred variant is shown in FIGS. 2 to 5. This variant uses the minimum number of reactors, i.e., a main reactor R and two smaller, identical auxiliary reactors H1 and H2. The valves 7, 8, 9, 10, etc. shown in white in the drawings are open. The valves 11, 12, 13, 14, 15, etc. shown in black are closed. The same applies to all FIGS. 2 to 11 and to FIG. 1.

This preferred alternative of the cyclic switching is distinguished by the following advantages:
- lasting protection of the main reactor by an auxiliary reactor
- minimal capital investment (two identical modules H1 and H2, shaft construction)
- minimal complexity because there are only three reactors to be switched.

According to the invention, the auxiliary reactors H1 and H2 are cyclically switched, as are the main reactors R1 and R2 where several main reactors are present, as in the second embodiment.

The production cycle for the alternating switching of the three reactors R, H1, H2 proceeds as follows:

Phase 1 (FIG. 2). In Phase 1, production is carried out at maximum reactor volume by arranging the reactors H1, R and H2 in series. The fatty acid methyl ester FAME 20 is fed into the main reactor R via the auxiliary reactor H1 (fixed bed reactor containing catalyst K). The auxiliary reactor H1 acts as a preliminary reactor in which contaminating catalyst poisons can be adsorbed.

Phase 2 (FIG. 3). Since deactivation starts from the upper layers of the bed, the catalyst bed K of the auxiliary reactor H1 then has to be renewed and activated. During this step, the auxiliary reactor H2 acts as a preliminary reactor of which the fixed bed K has not yet undergone any loss of activity by catalyst poisons. The throughput of liquid in Phase 2 is somewhat lower on account of the lower capacity.

Phase 3 (FIG. 4). In Phase 3, the freshly activated auxiliary reactor H1 is first arranged behind the main reactor to act as a reserve as deactivation of the preliminary reactor H2 progresses. During Phase 3, no deactivation of the auxiliary reactor is expected to occur because the temperatures are low with conversion well advanced and contaminations are mainly trapped in the preliminary reactor. The liquid throughput in Phase 3 is comparable with that in Phase 1.

Phase 4 (FIG. 5). In Phase 4, the catalyst bed K of the auxiliary reactor H2 is renewed and activated whereas the unimpaired bed of the auxiliary reactor H1 is used as a preliminary fixed bed K.

The production period then begins from the front with Phase 1 (FIG. 2).

Embodiment 2

The cyclic switching of reactors may also be analogously extended to two identical main reactors with two auxiliary reactors (see Phases 1 to 6 in FIGS. 6 to 11):

Phase 1 (FIG. 6). In this phase, the catalyst K of the main reactor R1 is renewed and activated. Production, i.e., the production of fatty alcohol, continues during the activation process, a relatively impure, i.e., not specially prepared, starting product FAME (feed) 20, i.e., one purified at minimal cost, being passed first through the auxiliary reactor H1, then through the main reactor R2 and finally through the auxiliary reactor H2 which serves as an after-reactor in this phase and in Phase 2. The feed 20 contains the usual level of catalyst poisons and has a relatively high iodine value. The feed is $C_{12-18}$ FAME or $C_{16-18}$ FAME.

Phase 2 (FIG. 7). In this phase, the catalyst K of the main reactor R2 is renewed and activated. The reaction takes place in a series arrangement of the reactors H1, R1 and H2. In contrast to Phase 1, only the main reactors R1 and R2 have "swapped" roles in Phase 2. The starting product 20 processed in Phase 2 is, again, a normal, i.e., relatively impure, starting product.

Figure 8:
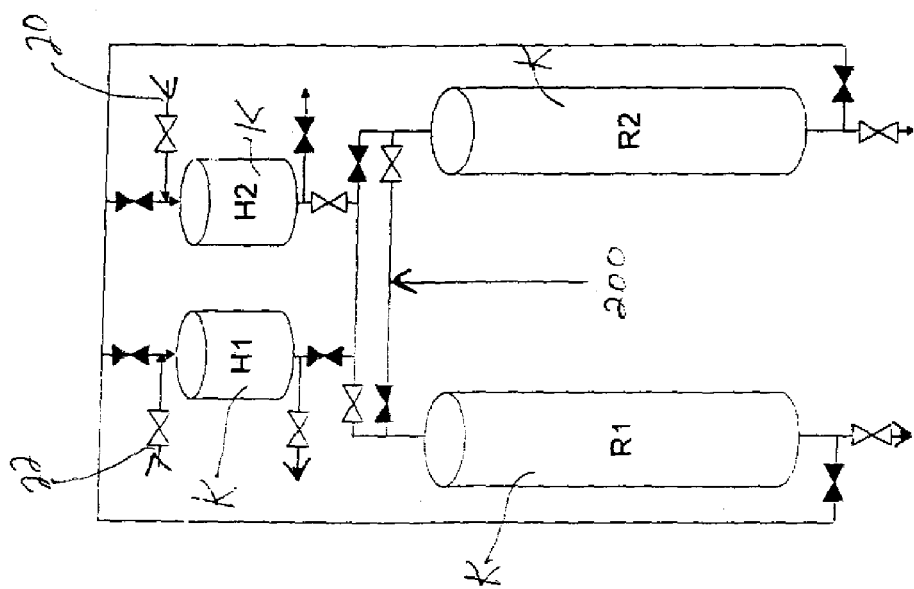
FIG. 8 shows Phase 3 of the cyclic switching illustrated in FIGS. 6 and 7, where the activation is H1 and the production (series arrangement) is H2+R1, R2.

Phase 3 (FIG. 8). The catalyst K in the auxiliary reactor H1 has now been exhausted and is renewed and activated. At the same time, production continues in the two main reactors R1 and R2 and with the auxiliary reactor H2 as the preliminary reactor for R1. A starting product of typical, relatively poor quality 20 is fed into the auxiliary reactor H2. A starting product of high quality 200, i.e., a particularly pure starting product with few catalyst poisons and a low iodine value, is fed into the main reactor R2. This starting product is $C_{12/14}$ FAME. Accordingly, the main reactor R2 does not require an auxiliary reactor as a preliminary reactor.

Figure 9:
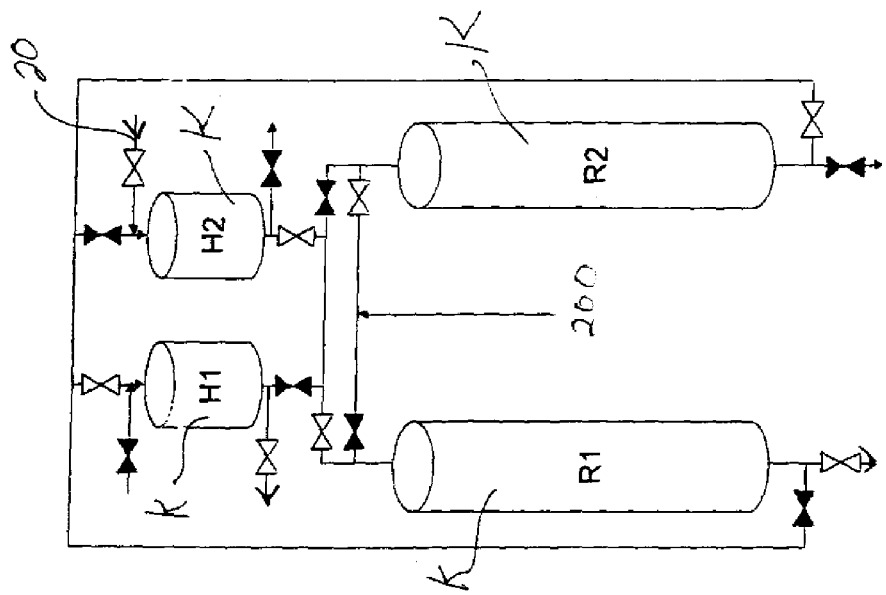
FIG. 9 shows Phase 4 of the cyclic switching illustrated in FIGS. 6 to 8, where the production (series arrangement) is H2+R1 and R2+H1.

Phase 4 (FIG. 9). This phase is carried out similarly to Phase 3. In Phase 4, the auxiliary reactor H1 with the now fresh catalyst K additionally serves as an after-reactor for the reactor R2 in which the high-quality starting product 200 is processed. Accordingly, this production phase can be carried out with an increased throughput because the amount of catalyst K is increased in relation to Phase 3.

Figure 10:
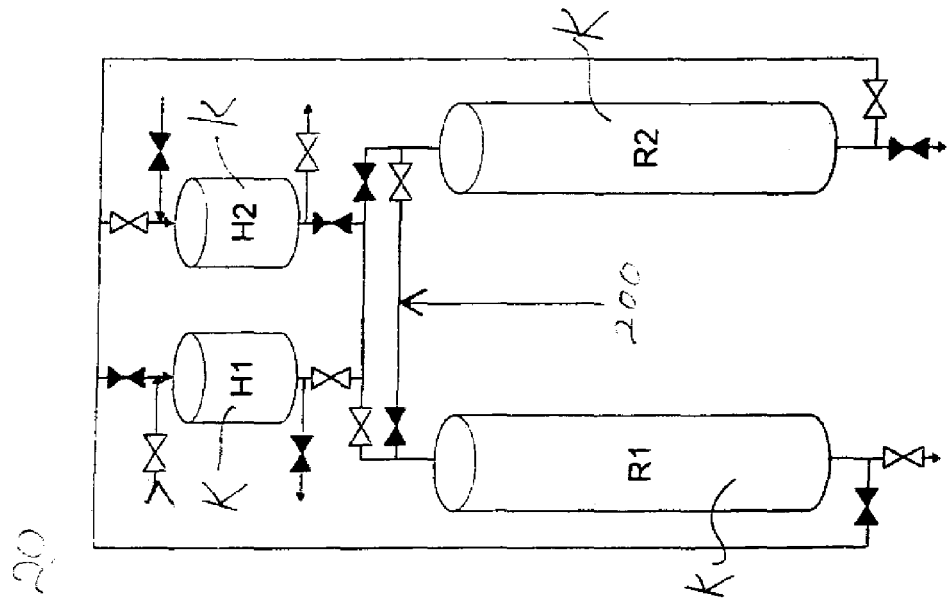
FIG. 10 shows Phase 5 of the cyclic switching illustrated in FIGS. 6 to 9, where the activation is H2 and the production (series arrangement) is H1+R1, R2.

Phase 5 (FIG. 10). The catalyst K in the auxiliary reactor H2 is now exhausted and is renewed and activated. The auxiliary reactor H1 now serves as a preliminary reactor for the main reactor R1 for processing a starting product of relatively poor quality 20. A high-quality starting product 200, i.e., a relatively pure starting product, is fed directly into the main reactor R2.

Figure 11:
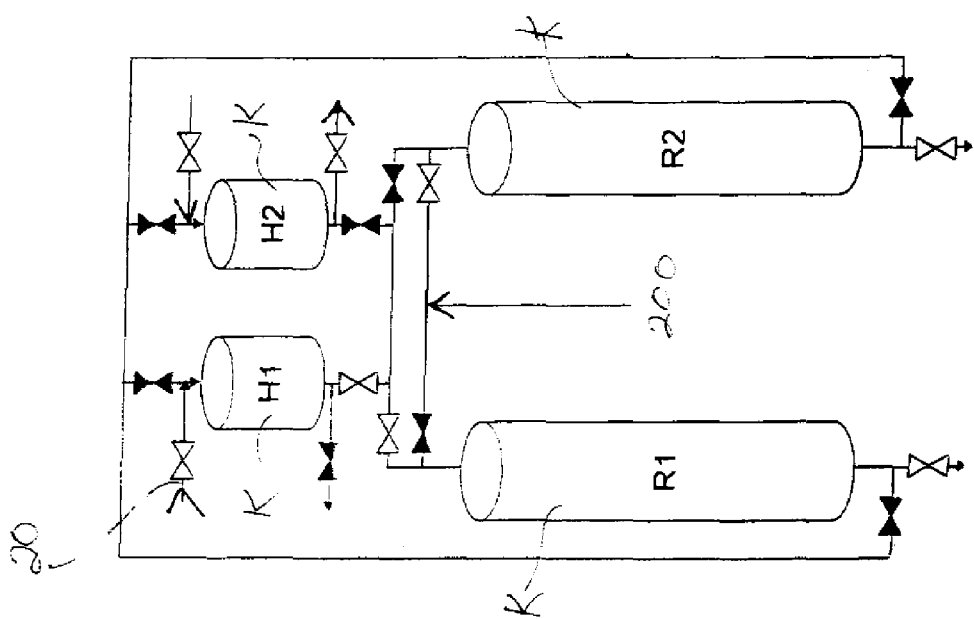
FIG. 11 shows Phase 6 of the cyclic switching illustrated in FIGS. 6 to 10, where the production (series arrangement) is H1+R1 and R2+H2.

Phase 6 (FIG. 11). The catalyst in the auxiliary reactor H2 is now renewed and activated. The auxiliary reactor H2 now serves as an after-reactor for the main reactor R2 in which the high-quality starting product 200 is processed, so that this production phase can be carried out with a relatively high throughput because the quantity of catalyst K is now greater than in Phase 5. Phase 6 is otherwise carried out in the same way as Phase 5. A starting product of relatively poor quality 20 continues to be fed into the main reactor R1, the auxiliary reactor H1 acting as a preliminary reactor.

The switching procedures described above are particularly advantageous for the high-pressure hydrogenation of fatty acid methyl esters to saturated fatty alcohols on typical Cu catalysts (for example Cu—ZnO or CuCr) because an almost complete conversion is the target here and the throughput has to be reduced in response to only minimal catalyst deactivation. The hydrogenation of the FAME to saturated fatty alcohols is typically carried out under pressures of 200 to 300 bar and at temperatures of 200 to 250° C.

The throughput of the liquid FAME lies at an LHSV of 0.5 to 2.5 $h^{-1}$ (depending on the type and activity of the heterogeneous catalyst used). The switching is also of advantage for the hydrogenation of unsaturated triglycerides of native fats and oils to fatty alcohol and 1,2-propanediol and for the hydrogenation of unsaturated fatty acids on fixed-bed Pd catalysts.

In view of the high-pressure operation, special safety devices not explicitly mentioned here, for example safety valves, are integrated into the switching system.

The switching process according to the invention as illustrated in FIGS. 2 to 5 can be put into practice under high-pressure conditions at particularly low cost. The complexity of the switching procedure and the number of phases per production cycle increase if the number of reactors is increased.

What is claimed is:

1. A process for carrying out heterogeneously catalyzed hydrogenation reactions in a fixed-bed reactor, comprising the steps of:
   (a) providing at least one main reactor containing a first amount of catalyst;
   (b) providing a first auxiliary reactor connected in selective fluid communication with said at least one main reactor such that it can be operated up stream or downstream of said main reactor and having contained therein a second amount of catalyst, said first amount of catalyst being relatively larger than said second amount of catalyst;
   (c) providing a second auxiliary reactor connected in selective fluid communication with said main reactor such that it can be operated upstream or downstream of said main reactor and having contained therein a third amount of catalyst, wherein the first amount of catalyst is relatively larger than the third amount of catalyst, said second and third amounts being the same or different;
   (d) during a first phase of operation of said process,
      (i) passing a starting product of a fatty compound through the first auxiliary reactor and reacting the starting product with hydrogen in the presence of the catalyst;
      (ii) continuing the reaction through the at least one main reactor to produce a main reactor effluent; and
      (iii) introducing said main reactor effluent into the second auxiliary reactor and continuing the reaction through the second auxiliary reactor; and (e) during a second phase of operation of said process,
- (i) selectively removing the first auxiliary reactor from fluid communication with the at least first main reactor and reactivating the catalyst in the first auxiliary reactor,
- (ii) passing a starting product of a fatty compound through the second auxiliary reactor and reacting the starting product with hydrogen in the presence of the catalyst, and
- (iii) continuing the reaction through the at least one main reactor to produce a main reactor effluent.

2. The process according to claim 1, further comprising a third phase of operation beginning after the catalyst in said first auxiliary reactor has been reactivated and in which said first auxiliary reactor is selectively connected in downstream fluid communication with the at least one main reactor.

3. The process according to claim 2, wherein during at least a portion of said third phase of operation the second auxiliary reactor is removed from fluid communication with the at least first main reactor and reactivating the catalyst in the second auxiliary reactor.

4. The process according to claim 1, wherein the first auxiliary reactor and the second auxiliary reactor are shaft reactors.

5. The process according to claim 1, wherein the fatty compound is selected from the group consisting of a natural fat, an oil, and derivatives thereof.

6. The process according to claim 1, wherein the fatty compound is a fatty acid methyl ester.

7. The process according to claim 1, wherein the fatty compound is a fatty acid methyl ester which is hydrogenated to form a fatty alcohol.

8. The process according to claim 1, wherein the fatty compound is a triglyceride which is hydrogenated to form a saturated fatty alcohol.

9. The process according to claim 1, wherein the fatty compound is a fatty acid ester which is hydrogenated to form an aldehyde.

10. A process for carrying out heterogeneously catalyzed hydrogenation reactions in a fixed-bed reactor, comprising the steps of:
- (a) providing at least a first main reactor and a second main reactor, each containing a first amount of catalyst;
- (b) providing a first auxiliary reactor and a second auxiliary reactor, wherein each is connected in selective fluid communication with the first and second main reactors such that the first and second auxiliary reactors can be independently operated upstream or downstream of the first and second main reactors, the first auxiliary reactor having contained therein a second amount of catalyst and the second auxiliary reactor having contained therein a third amount of catalyst, the first amount of catalyst being relatively larger than each of the second amount and third amount of catalyst;
- (c) during a first phase of operation of said process,
  - (i) selectively removing the first main reactor from fluid communication with the first and second auxiliary reactors and reactivating the catalyst in the first main reactor,
  - (ii) passing a relatively impure starting product of a fatty compound through the first auxiliary reactor wherein the starting product reacts with hydrogen in the presence of the catalyst, and
  - (iii) continuing the reaction process through the second main reactor and the second auxiliary reactor;
- (d) during a second phase of operation of said process,
  - (i) selectively removing the second main reactor from fluid communication with the first and second auxiliary reactors and reactivating the catalyst in the second main reactor,
  - (ii) passing the relatively impure starting product through the first auxiliary reactor, and
  - (iii) continuing the reaction process through the first main reactor and the second auxiliary reactor;
- (e) during a third phase of operation of said process,
  - (i) selectively removing the first auxiliary reactor from fluid communication with the first and second main reactors and reactivating the catalyst in the first auxiliary reactor,
  - (ii) passing the relatively impure starting product through the second auxiliary reactor, and continuing the reaction process through the first main reactor, and
  - (iii) passing a relatively pure starting product of a fatty compound through the second main reactor,
- (f) during a fourth phase of operation of said process,
  - (i) selectively removing the first auxiliary reactor from fluid communication with the first main reactor, and selectively removing the second auxiliary reactor from fluid communication with the second main reactor,
  - (ii) passing the relatively impure starting product through the second auxiliary reactor, and continuing the reaction process through the first main reactor, and
  - (iii) passing a relatively pure starting product of a fatty compound through the second main reactor, and continuing the reaction process through the first auxiliary reactor;
- (g) during a fifth phase of operation of said process,
  - (i) selectively removing the second auxiliary reactor from fluid communication with the first and second main reactors and reactivating the catalyst in the second auxiliary reactor,
  - (ii) passing the relatively impure starting product through the first auxiliary reactor, and continuing the reaction process through the first main reactor, and
  - (iii) passing the relatively pure starting product through the second main reactor; and
- (h) during a sixth phase of operation of said process,
  - (i) selectively removing the first auxiliary reactor from fluid communication with the second main reactor, and selectively removing the second auxiliary reactor from fluid communication with the first main reactor,
  - (ii) passing the relatively impure starting product through the first auxiliary reactor, and continuing the reaction through the first main reactor, and
  - (iii) passing the relatively pure starting product through the second main reactor, and continuing the reaction through the second auxiliary reactor.

11. The process according to claim 10, wherein the relatively pure starting product comprises fatty acid methyl esters with a chain length of $C_{12/14}$ and the relatively impure starting product comprises fatty acid methyl esters with a chain length of $C_{12-22}$.

12. The process according to claim 10, wherein the relatively pure starting product comprises fatty acid methyl esters with a chain length of $C_{12/14}$ and the relatively impure starting product comprises fatty acid methyl esters with a chain length of $C_{12-18}$.

13. The process according to claim 10, wherein the relatively pure starting product comprises fatty acid methyl esters with a chain length of $C_{12/14}$ and the relatively impure starting product comprises fatty acid methyl esters with a chain length of $C_{16-22}$.

14. The process according to claim 10, wherein the relatively pure starting product comprises fatty acid methyl esters with a chain length of $C_{12/14}$ and the relatively impure starting product comprises fatty acid methyl esters with a chain length of $C_{16-18}$.

15. The process according to claim 10, wherein the first auxiliary reactor and second auxiliary reactor are shaft reactors.

16. The process according to claim 10, wherein the first auxiliary reactor and second auxiliary reactor are shaft reactors, and the first main reactor and second main reactor are tube-bundle reactors.

17. The process according to claim 10, wherein the first auxiliary reactor and second auxiliary reactor are shaft reactors, and the first main reactor and second main reactor are shaft reactors.

18. The process according to claim 10, wherein during reactivation of either the first main reactor or the second main reactor, only the relatively impure starting product is processed.

19. The process according to claim 10, wherein when the first main reactor and second main reactor and first auxiliary reactor and second auxiliary reactor are in operation, a preliminary reactor is used during processing of the relatively impure starting product while an after-reactor is used during processing of the relatively pure starting product.

20. A system for carrying out heterogeneously catalyzed hydrogenation reactions in a fixed-bed reactor comprising:

(a) at least one main reactor containing a first amount of catalyst;

(b) a first auxiliary reactor connected in selective fluid communication with said main reactor such that it can be operated upstream or downstream of said main reactor and having contained therein a second amount of catalyst, said first amount of catalyst being relatively larger than said second amount of catalyst;

(c) a second auxiliary reactor connected in selective fluid communication with said main reactor such that it can be operated upstream or downstream of said main reactor and having contained therein a third amount of catalyst, wherein the first amount of catalyst is relatively larger than the third amount of catalyst, said second and third amounts being the same or different; and (d) a source of catalyst regeneration fluid in selective fluid communication with at least said first and second auxiliary reactors.

* * * * *